(12) United States Patent
Matsumoto et al.

(10) Patent No.: US 11,309,760 B2
(45) Date of Patent: Apr. 19, 2022

(54) ROTARY ELECTRIC MACHINE

(71) Applicant: TOYOTA JIDOSHA KABUSHIKI KAISHA, Toyota (JP)

(72) Inventors: Masashi Matsumoto, Nagoya (JP); Hazuki Kawamura, Nisshin (JP); Kohei Watanabe, Okazaki (JP); Yuki Tanaka, Toyota (JP); Haruki Kusamaki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 157 days.

(21) Appl. No.: 16/734,450

(22) Filed: Jan. 6, 2020

(65) Prior Publication Data

US 2020/0235627 A1    Jul. 23, 2020

(30) Foreign Application Priority Data

Jan. 22, 2019   (JP) .............................. JP2019-008677

(51) Int. Cl.
| | |
|---|---|
| *H02K 3/22* | (2006.01) |
| *H02K 3/24* | (2006.01) |
| *H02K 1/32* | (2006.01) |
| *H02K 3/48* | (2006.01) |
| *H02K 3/34* | (2006.01) |
| *H02K 1/20* | (2006.01) |

(52) U.S. Cl.
CPC ................. *H02K 3/24* (2013.01); *H02K 1/20* (2013.01); *H02K 1/32* (2013.01); *H02K 3/34* (2013.01); *H02K 3/48* (2013.01)

(58) Field of Classification Search
CPC ............... H02K 3/22; H02K 3/24; H02K 3/48
See application file for complete search history.

(56) References Cited

U.S. PATENT DOCUMENTS

| | | | | |
|---|---|---|---|---|
| 1,370,156 A | * | 3/1921 | Rudenberg ............... | H02K 3/22 310/64 |
| 2,727,161 A | * | 12/1955 | Kilner ...................... | H02K 3/24 310/64 |

(Continued)

FOREIGN PATENT DOCUMENTS

| | | |
|---|---|---|
| JP | 2005-012989 A | 1/2005 |
| JP | 2012-100433 A | 5/2012 |
| JP | 2013-013182 A | 1/2013 |

(Continued)

*Primary Examiner* — Dang D Le
(74) *Attorney, Agent, or Firm* — Oblon, McClelland, Maier & Neustadt, L.L.P.

(57) ABSTRACT

A rotary electric machine includes a stator core having a plurality of teeth arranged in a row along a circumferential direction of the stator core, and a stator coil composed of a winding wire wound around the teeth. The stator coil includes coil end portions extending, outside the stator core in an axial direction thereof, along a substantially circumferential direction of the stator core, and straight portions extending along the axial direction, the straight portions being at least partially housed in a slot which is a void defined by two adjacent teeth of the plurality of teeth. In the rotary electric machine, a cooling groove is formed at least in the straight portion, the cooling groove functioning as a cooling channel through which a cooling fluid flows, and each straight portion includes only one cooling channel.

6 Claims, 13 Drawing Sheets

(56) References Cited

U.S. PATENT DOCUMENTS 3,014,139 A * 12/1961 Shildneck ................ H02K 3/22
                                                                     310/64
2016/0261159 A1     9/2016  Tsuiki et al.

FOREIGN PATENT DOCUMENTS

| JP | S50-95702 | 7/2015 |
| WO | WO2015052964 A1 | 4/2015 |

* cited by examiner

ROTARY ELECTRIC MACHINE

CROSS REFERENCE TO RELATED APPLICATION

This application claims priority to Japanese Patent Application No. 2019-008677 filed on Jan. 22, 2019, which is incorporated herein by reference in its entirety including the specification, claims, drawings, and abstract.

TECHNICAL FIELD

This specification discloses a rotary electric machine equipped with a stator core having a plurality of teeth and a stator coil wound around the stator core.

BACKGROUND

In general, rotary electric machines are equipped with a rotor and a stator which are disposed concentrically, and the stator is composed of a stator coil wound around teeth of a stator core. In response to driving of the rotary electric machine, heat is generated by a rotor core, the stator core, and the stator coil, resulting in an increase in temperature of these components. Excessively increased temperatures of the components has been known to cause performance deterioration of the rotary electric machines. To avoid this, there have conventionally been suggested many techniques for cooling the rotor core, the stator core, and the stator coil.

For example, Patent Document 1 (JP 2005-012989 A) discloses a technique in which a cooling oil channel extending along a radial direction is formed in a stator core for allowing a slot to communicate with an outer circumferential portion of the stator core, and a cooling oil is supplied from an outer circumferential direction of the stator core through the cooling oil channel into the slot, to thereby cool a stator coil within the slot. Meanwhile, Patent Document 2 (JP 2012-100433 A) discloses a technique in which a plurality of depressed grooves for passage of a cooling medium are formed on an outer surface of a stator coil, and the cooling medium is introduced into the depressed grooves to cool the stator coil.

CITATION LIST

Patent Literature

Patent Document 1: JP 2005-012989 A
Patent Document 2: JP 2012-100433 A

In the technique disclosed in Patent Document 1 (JP 2005-012989 A), the stator coil can be cooled to a certain extent. In general, however, in order to increase a space factor of the stator coil, the stator coil is housed in the slot with its windings closely contacting each other and having almost no gaps therebetween. For this reason, because a region around the stator coil includes almost no space through which the cooling oil can flow, the cooling oil cannot be distributed all over the region around the stator coil simply by supplying the cooling oil into the slot. As a result, the technique of Patent Document 1 (JP 2005-012989 A) has been insufficient for cooling the stator coil adequately.

Meanwhile, in Patent Document 2 (JP 2012-100433 A), because the depressed grooves are formed on the outer surface of the stator coil, the cooling medium is apt to flow around the stator coil, so that the stator coil can be effectively cooled. However, in Patent Document 2 (JP 2012-100433 A), a cross sectional area of the stator coil tends to become smaller due to the formation of the plurality of depressed grooves in the single stator coil. In the stator coil whose cross sectional area is small, an electrical resistance is, of cause, increased, which can, in turn, increase an amount of heat generation. That is, in the technique disclosed in Patent Document 2 (JP 2012-100433 A), it has not been possible to effectively suppress a rise in temperature of the stator coil.

Under the circumstances, the present specification discloses a rotary electric machine in which a rise in temperature of a stator coil can be prevented in an efficient way.

SUMMARY

In an aspect of the disclosure, a rotary electric machine disclosed herein includes a stator core having a plurality of teeth arranged in a row along a circumferential direction of the stator core, and a stator coil composed of a winding wire wound around one or more of the plurality of teeth, in which the stator coil has coil end portions extending, outside the stator core in an axial direction thereof, along a substantially circumferential direction of the stator core, and straight portions extending along the axial direction, the straight portions being at least partially housed in a slot which is a void defined between two adjacent teeth of the plurality of teeth. Further, in the rotary electric machine, a cooling groove is formed at least in the straight portion, the cooling groove being configured to function as a cooling channel through which a cooling fluid flows, and only one cooling groove is formed for each of the straight portions.

When cooling grooves are provided to the straight portions, the cooling fluid can easily flow around the straight portions, which can allow the stator coil to be cooled effectively. In addition, because the number of cooling grooves formable for each straight portion is limited to one, a decrease in a cross sectional area of the straight portion and thus an increase in electric resistance of the straight portion can be hampered, which can, in turn, prevent an increase in an amount of heat generated in the straight portion. As a result, it becomes possible to effectively reduce a rise in temperature of the stator coil.

In an aspect of this disclosure, the cooling groove may be formed only in the straight portion, without having the cooling groove in the coil end portion.

When configured as described above, a decrease in the cross sectional area of the coil end portion can be prevented, and thus an increase in an amount of heat generated in the coil end portion can be hampered.

Further, in the above-described form, the stator coil may be composed of first segment coils, each functioning as the straight portion, and a second segment coil functioning as the coil end portion, the second segment coil being an independent member separated from the first segment coils and being connected to each of the first segment coils by a joint pipe.

When the straight portions in which the cooling grooves are formed and the coil end portions in which no cooling grooves are formed are provided as separate members, formation of the cooling grooves can be simplified.

In an aspect of this disclosure, each slot may house two or more of the straight portions, and among the two or more of the straight portions, adjacent straight portions within the slot may be placed in a position where the cooling grooves of the adjacent straight portions are opposed to each other.

When configured as described above, a ratio of a cross sectional area to a surface area of the cooling channel can be increased, which can help lower a flow passage resistance. As a result, because a smoother flow of the cooling fluid can be realized, efficiency in cooling can be improved.

In an aspect of this disclosure, the rotary electric machine further includes a rotor concentrically arranged inside a stator, the rotor including a cooling channel which extends along a radial direction of the rotor to an outer circumferential end thereof, in which one of the straight portions that is arranged at a radial innermost position within the slot may have the cooling groove formed in an radial inner end face of the one of the straight portions.

When configured as describe above, the cooling groove is able to receive the cooling fluid ejected from the rotor. In this way, because the cooling fluid is apt to flow through the cooling groove along the axial direction, it becomes possible to effectively cool the straight portions in the entirety thereof.

In an aspect of this disclosure, the cooling groove may be formed on one of circumferential end faces of the straight portion.

In the above-described form, reliable introduction, into the cooling channel, of the cooling fluid flowing on the coil end portion can be ensured.

Further, in the above form, the rotary electric machine may be installed in a position in which an axial direction of the rotary electric machine intersects the direction of gravity, and the rotary electric machine may further include a cooling medium pipe configured to discharge a cooling fluid toward the coil end portion from above the coil end portion in the direction of gravity, in which the cooling groove may be formed on only one of the circumferential end faces of the straight portion, the one being located on an upper side of the straight portion in the direction of gravity.

When configured as described above, the cooling fluid which is directed downward by gravitation can flow into the cooling groove with a higher degree of reliability.

In an aspect of this disclosure, the cooling groove may be formed on only one of the circumferential end faces of the straight portion, the one being located upstream in a direction of forward rotation of the rotor.

The above configuration can further ensure that the cooling fluid discharged from the rotor is reliably introduced into the cooling groove.

In an aspect of this disclosure, the cooling groove may have a substantially semicircular shape in cross section.

When formed as described above, a flow passage resistance can be reduced, and the efficiency in cooling can be accordingly improved.

In the rotary electric machine disclosed herein, a rise in temperature of the stator coil can be reduced with a higher degree of efficiency.

BRIEF DESCRIPTION OF DRAWINGS

Embodiments of the present disclosure will be described based on the following figures, wherein.

DESCRIPTION OF EMBODIMENTS

Figure 1:
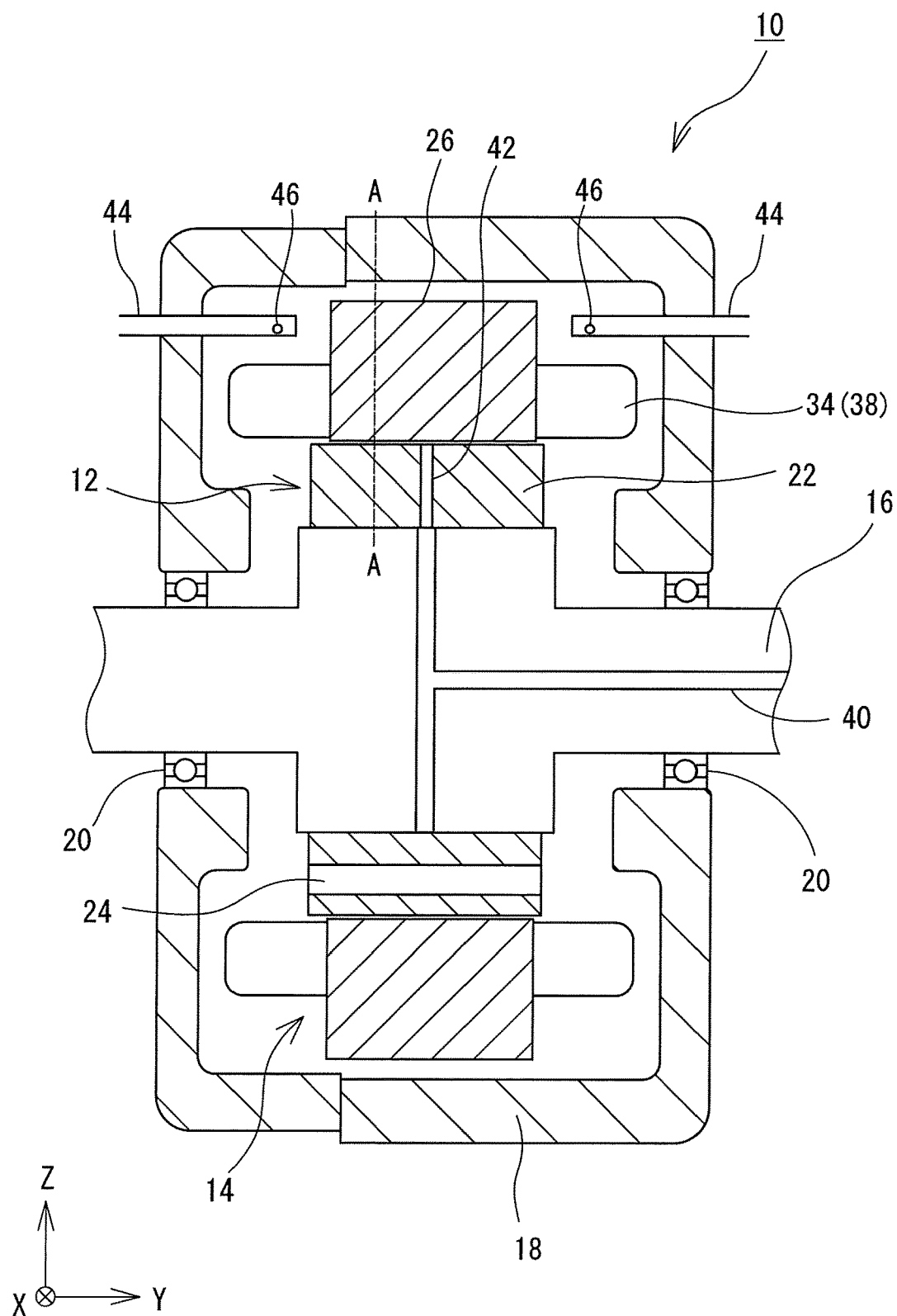
FIG. 1 is a general cross section view of a rotary electric machine.
Figure 2:
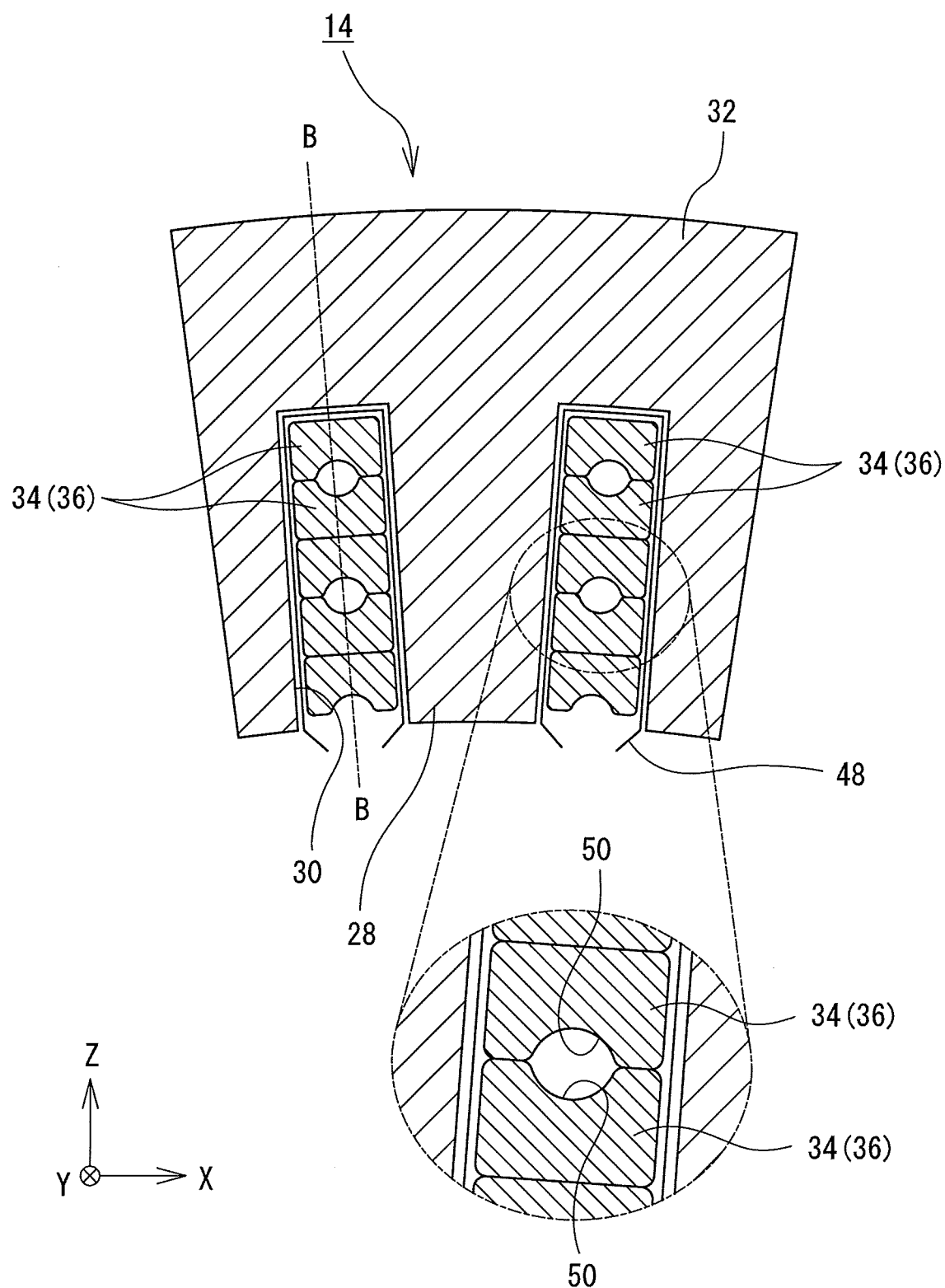
FIG. 2 is a general cross section view of a stator taken along a line A-A indicated in FIG. 1.
Figure 3:
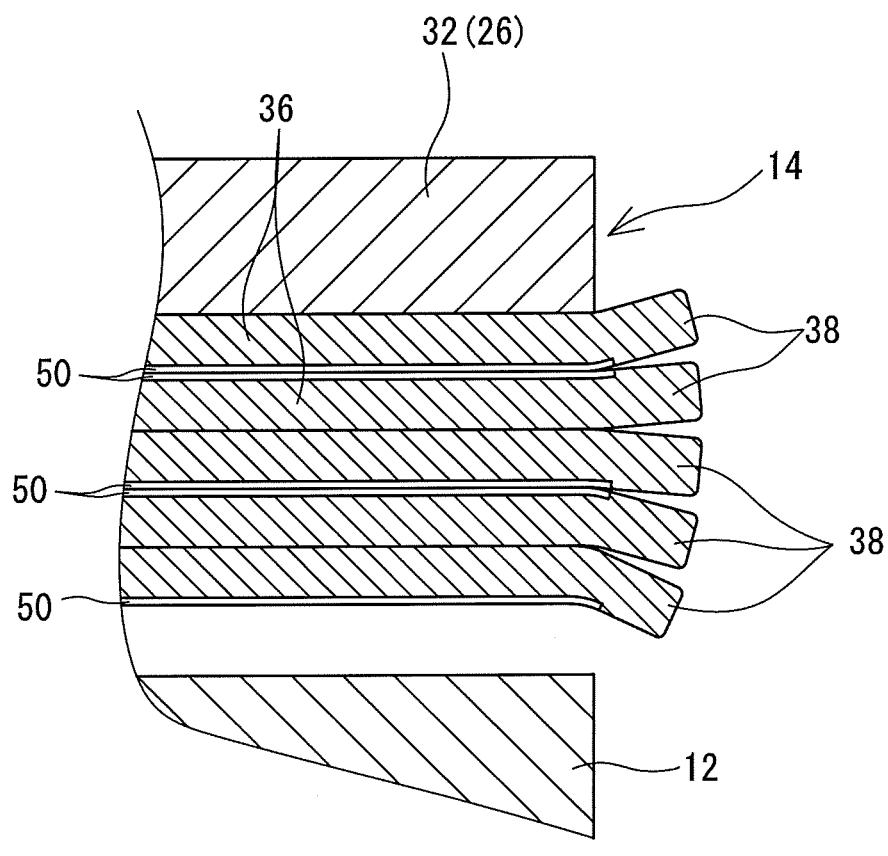
FIG. 3 is a schematic cross section view taken along a line B-B indicated in FIG. 2.

Hereinafter, structure of a rotary electric machine 10 will be described with reference to the drawings. FIG. 1 is a general cross section view of the rotary electric machine 10. FIG. 2 is a cross section view taken along a line A-A indicated in FIG. 1, and FIG. 3 is a schematic cross section view taken along a line B-B indicated in FIG. 2. It should be noted that in FIG. 1, the pull of gravity acts, on a paper sheet of the diagram, from an upper side toward a lower side of the paper sheet, and a Z axis direction is the direction of gravity, while an X axis direction and a Y axis direction are horizontal directions.

The rotary electric machine 10 is mounted on an electrically-driven vehicle, such as, for example, a hybrid automobile or an electric automobile. In the electrically-driven vehicle, the rotary electric machine 10 may be used as a drive motor which generates power to drive the vehicle, and may be used as a generator which produces electricity by means of regenerative braking force or a surplus of engine power. In the electrically-driven vehicle, the rotary electric machine 10 is mounted in a position where a rotation shaft 16 of the rotary electric machine 10 intersects the direction of gravity; in particular, a position where the rotation shaft 16 is substantially orthogonal to the direction of gravity. However, the rotary electric machine 10 is not limited to the above-described mounting position, and may be mounted in a position where its axial direction is parallel to the direction of gravity.

The rotary electric machine 10 includes the rotation shaft 16, a rotor 12 fixedly attached to the rotation shaft 16, a stator 14 concentrically placed around an outer circumference of the rotor 12, and a motor case 18 for housing the rotation shaft 16, the rotor 12, and the stator 14. The rotation shaft 16 is supported through a bearing 20 by the motor case 18, and is accordingly configured to be rotatable. The rotation shaft 16 is internally provided with an in-shaft channel 40 through which a cooling fluid flows. The in-shaft channel 40 is extended from one end of the rotation shaft 16 along its axial direction and then extended along its radial direction to a position capable of communicating with a rotor channel 42 which will be described below.

The rotor 12 is a substantially annular member including a rotor core 22 formed of laminated steel sheets or other materials and a plurality of permanent magnets 24 embedded in the rotor core 22. The rotor 12 is fixedly mounted on the rotation shaft 16, and the rotation shaft 16 is integrally rotated together with the rotor 12. The rotor 12 is internally provided with the rotor channel 42 extending along the radial direction from an inner circumferential end to an outer circumferential end of the rotor 12. The rotor channel 42 is a flow passage through which the cooling fluid supplied through the in-shaft channel 40 flows. The cooling fluid supplied into the rotor channel 42 is directed outward in the radial direction by a centrifugal force generated by rotation of the rotor 12 and then ejected from the outer circumferential end of the rotor 12 to the outside. In the course of the cooling fluid flowing through the rotor channel 42, the cooling fluid exchanges heat with the rotor 12, to thereby cool the rotor 12. Then, the cooling fluid ejected to the outside impinges on the stator 14, so that the stator 14 is cooled. It should be noted that although only one rotor channel 42 is illustrated in FIG. 1, the number of rotor channels 42 and a layout thereof may be changed as appropriate. In this regard, multiple rotor channels 42 may be provided so as to be spaced from each other in the axial direction.

The stator 14 includes a stator core 26 and a stator coil 34. The stator core 26 is a substantially annular member composed of laminated steel sheets and the like, and includes an annular yoke 32 and a plurality of teeth 28 protruding inward in the radial direction from an inner circumference of the yoke 32. A space between adjacent teeth 28 defines a slot 30 for housing straight portions 36 of the stator coil 34 which will be described below.

The stator coil 34 is composed of a winding wire wound around the teeth 28. In this example, the stator coil 34 is formed by connecting coils of three phases; i.e., a U-phase coil, a V-phase coil, and a W-phase coil. When the rotary electric machine 10 is used as the motor, three-phase alternating current is supplied to the stator coil 34. As a result, a rotating magnetic field is produced, and the rotor 12 is accordingly rotated. On the other hand, when the rotary electric machine 10 is used as the generator, the regenerative braking force and the surplus of engine power are used for rotating the rotation shaft 16 together with the rotor 12. As a result, currents are induced in the stator coil 34. It should be noted that a way of winding the winding wire may be a concentrated winding method for winding the winding wire around one of the teeth 28, or may be a distributed winding method for winding the winding wire over two or more of the teeth 28. Hereinafter, description is provided, by way of illustration, with respect to a distributed winding.

The stator coil 34 is broadly divided into coil end portions 38 extending, outside the stator core 26 in its axial direction, along a substantially circumferential direction of the stator core 26, and straight portions 36 extending along the axial direction. The straight portions 36 are at least partially housed within the slot 30. In this example as shown in FIG. 2, two or more (five, in the illustrated example) of the straight portions 36 are housed in one slot 30 and aligned in a row along the radial direction. A bundle of the two or more of the straight portions 36 is surrounded by an insulator 48. The insulator 48 is a sheet member which is disposed within the slot 30 in order to insulate the stator coil 34 from the stator core 26. The insulator 48 is disposed within the slot 30 in a bent form having the shape like a letter U with a mouth which is open toward the rotor 12 on a radially inner side of the insulator 48.

As can be seen from FIG. 2, the stator coil 34 in this example is implemented by means of a rectangular wire having a rectangular shape in cross section, and a cooling groove 50 extending along the axial direction is formed on an outer face of the straight portion 36. In this way, it becomes possible to effectively cool the stator coil 34 while securing a sufficient space factor, as will be described further below.

Meanwhile, as shown in FIG. 1, the rotary electric machine 10 further includes a pair of cooling medium pipes 44. Each cooling medium pipe 44 is a pipe through which a cooling fluid flows, and an outlet port 46 for discharging the cooling fluid is formed in the vicinity of an end of the cooling medium pipe 44. The cooling medium pipe 44 is arranged in a position where the outlet port 46 is located above the coil end portion 38 in the direction of gravity. The cooling fluid discharged from the outlet port 46 and the cooling fluid ejected from the rotor channel 42 flow downward by gravitation while exchanging heat with the stator 14, and then trapped in a bottom portion of the motor case 18. The cooling fluids trapped in the bottom portion of the motor case 18 are recovered as appropriate, and recharged into the cooling medium pipe 44 and the in-shaft channel 40.

As is evident from the above explanation, the stator core 26 and the stator coil 34 in this example are cooled with the cooling fluids discharged from the outer circumferential end of the rotor 12 and discharged from the outlet port 46. Here, in this example as described above, the rectangular wire is used for the stator coil 34 and the straight portions 36 are aligned in a single row so as to contact intimately with each other within the slot 30. Such an intimately contacting arrangement of the rectangular wire can help increase the space factor. However, in connection with the arrangement including almost no void around the straight portions 36, there has been a problem in that the cooling fluid is hardly distributed around the straight portions 36.

To resolve the problem in this example, each of the straight portions 36 is provided, on an outer surface thereof, with the cooling groove 50 functioning as a cooling channel through which the cooling fluid flows. The cooling groove 50 is defined to extend along the axial direction on an end face of the straight portion 36 in the radial direction. Only one cooling groove 50 is formed for each of the straight portions 36. When the cooling groove 50 is formed in each of the straight portions 36 as described above, the cooling fluid is easily directed to flow through the cooling groove 50, and is thus able to effectively cool the stator coil 34 (the straight portions 36) within the slot 30. Because the number of cooling grooves 50 that can be formed for each of the straight portions 36 is limited to one, a decrease in the cross section area of the straight portion 36 and thus an increase in electric resistance of the strait portion 36 can be suppressed to minimum levels. As a result, an increase in the amount of heat generation associated with the increase in electric resistance can be minimized, to thereby effectively prevent a rise in temperature of the stator coil 34.

In general, the stator coil 34 tends to have a higher temperature than the stator core 26. For this reason, a region of the straight portion 36 that is located close to a wall surface of the slot 30 (the stator core 26) is able to exchange heat with the stator core 26, and heat in the region can be removed through the heat exchange to a certain extent. On the other hand, another region of the straight portion 36 that is in close contact with another straight portion 36; i.e., the radial end faces of the straight portion 36, cannot exchange heat with the stator core 26, and therefore tends to have a higher temperature. In view of the circumstances, in this example the cooling groove 50 is formed on the radial end face, which can allow the stator coil 34 to be cooled in a further effective way.

Figure 4A:
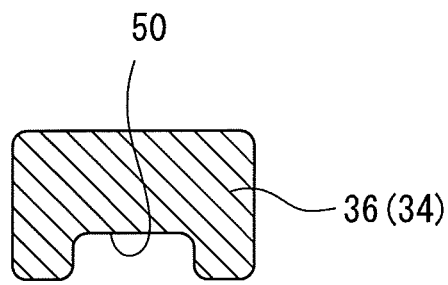
FIG. 4A shows an example of a cross section shape of a straight portion.
Figure 4B:
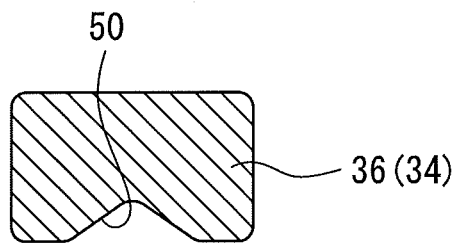
FIG. 4B shows another example of the cross section shape of the straight portion.

Further, as shown in FIG. 2, the cooling groove 50 in this example has a substantially semicircular shape in cross section. In other words, the cooling groove 50 is defined only by a smoothly curved contour without having any corners. In this way, a flow passage resistance can be reduced, to thereby facilitate a smooth flow of the cooling fluid. As a result, efficiency in cooling of the stator coil 34 can be enhanced. However, the shape of the cooling groove 50 may be changed as appropriate, and the cooling groove 50 may have a substantially rectangular cross section shape as shown in FIG. 4A, a substantially triangular cross section shape as shown in FIG. 4B, and other shapes.

Further, in this example, as shown in FIG. 2, two of the straight portions 36 radially adjacent to each other within the slot 30 are placed in a position where their cooling grooves 50 are opposed to each other. As a result, a single, integrated opening having a substantially circular shape in cross section is defined by the two cooling grooves 50. Because a ratio of a cross section area to a surface area of the opening having such a circular cross section shape is greater than that of an opening having a semicircular cross section shape, a flow passage resistance (pipe-fluid friction) per unit flow rate in the opening having the circular cross section shape can be smaller. This can allow the cooling fluid to flow with a higher degree of efficiency and, in turn, further ensure effective cooling of the stator coil 34.

Moreover, in this example, one of the straight portions 36 that is disposed at a radially innermost position within the slot 30 has the cooling groove 50 on a radially inner end face; i.e., a face opposed to the rotor 12. In this way, the cooling groove 50 becomes able to easily receive the cooling fluid which is ejected outward in the radial direction from the rotor channel 42. Because a flowable direction of the cooling fluid received in the cooling groove 50 is restricted to the axial direction, the cooling fluid received in the cooling groove 40 is more apt to flow along the axial direction than is the cooling fluid received on the radially inner end face (flat surface) of the straight portion 36. Therefore, the straight portion 36 can be cooled throughout its length by the cooling fluid flowing along the axial direction.

Meanwhile, in this example, the cooling groove 50 is formed only in the straight portion 36, but is not formed in the coil end portion 38. This can prevent a cross section area of the coil end portion 38 from becoming smaller, and thus can prevent an increase in the amount of heat generated in the coil end portion 38. However, the cooling groove 50 may be extended from the straight portion 36 to the coil end portion 38, as long as sufficient cooling performance can be secured. It should be noted that, as shown in FIG. 3, portions of the winding wire of the stator coil 34 tightly contact each other within the slot 30, while portions of the winding wire located outside the stator core 26 are bent to create small gaps therebetween. For this reason, the cooling fluid supplied to the coil end portions 38 is allowed to flow into the cooling grooves 50 through the gaps.

Figure 5:
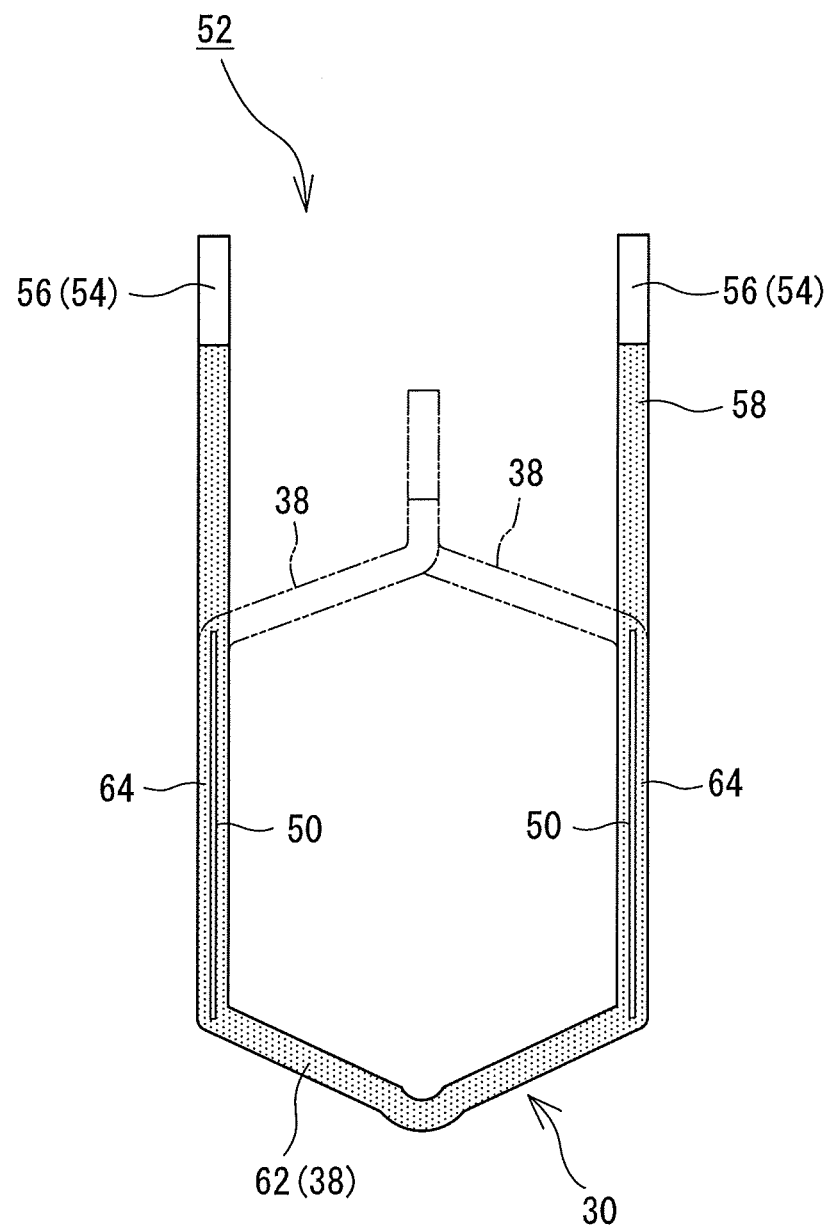
FIG. 5 shows an example of a segment coil.
Figure 6:
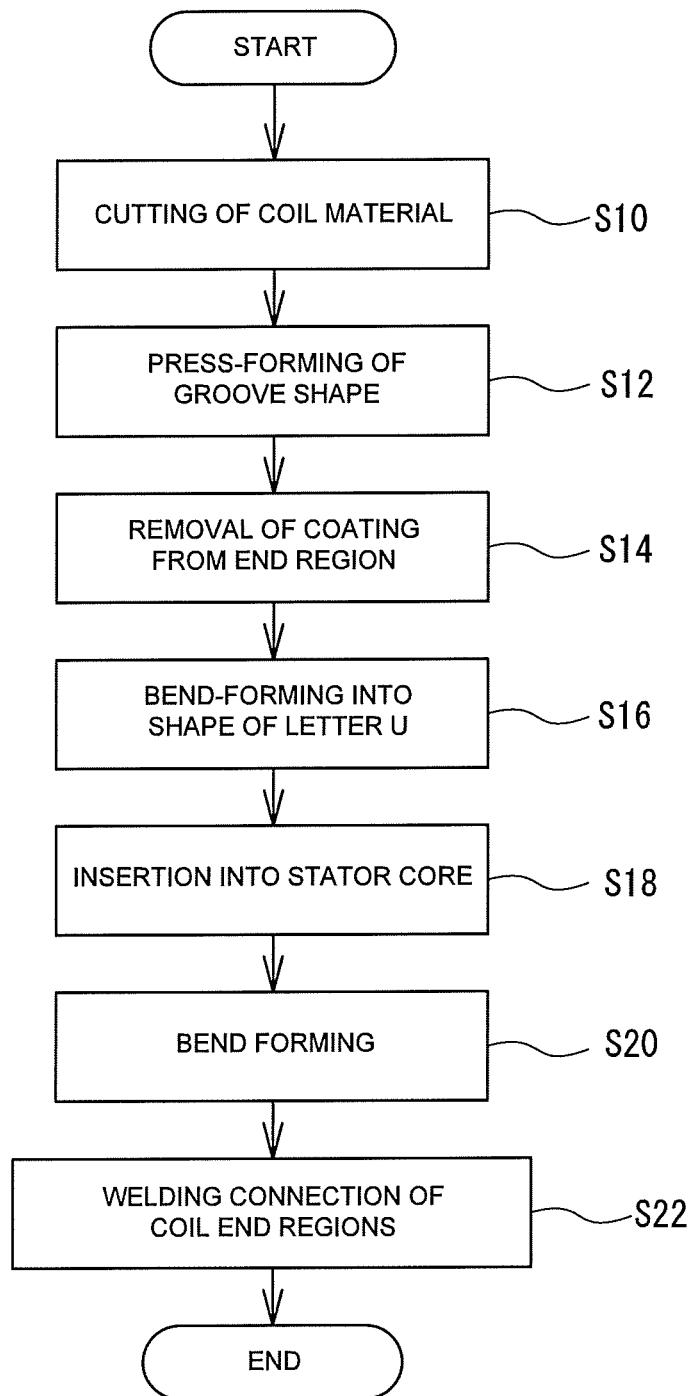
FIG. 6 is a flowchart representing a flow of process steps to manufacture a stator coil using the segment coil depicted in FIG. 5.

Next, a method for manufacturing the stator coil 34 having the cooling grooves 50 will be briefly explained. The stator coil 34 is formed by connecting a plurality of segment coils 52. FIG. 5 shows an example of the segment coil 52, and FIG. 6 is a flowchart representing a flow of process steps to manufacture the stator coil 34 by means of the segment coils 52 illustrated in FIG. 5.

To manufacture the stator coil 34, the segment coils 52 illustrated in FIG. 5 are initially produced from a coil material (in steps S10 to S16). The segment coil 52 is obtained by forming a predetermined length of the coil material in the shape substantially like the letter U as shown in FIG. 5. When explained from a different perspective, the segment coil 52 is composed of a V-shaped portion 62 having a substantially V shape and leg portions 64 which are seamlessly joined to respective ends of the V-shaped portion 62. The V-shaped portion 62 constitutes the coil end portion 38. Meanwhile, each of the leg portions 64 constitutes both the straight portion 36 and the coil end portion 38, and after assembly onto the stator core 26, the leg portions 64 are bent along the circumferential direction at some middle points.

The coil material is obtained by covering, with an insulation coating 58, a conductive wire 56 formed of a conductive material (such as, for example, copper). To produce the segment coil 52, the coil material is cut at a predetermined length (in step S10). Then, the cooling groove 50 is press-formed on a region of the cut coil material, the region corresponding to the straight portion 36 (in step S12). Following this, the insulation coating 58 is removed from both end regions (coil end regions 54) of the cut coil material in order to expose the conductive wire 56 (in step S14). Then, the cut coil material is bent substantially in the shape of the letter U using a predetermined mold or the like, to obtain the complete segment coil 52 (in step S16). To manufacture one stator coil 34, a plurality of the segment coils 52 are produced by repeating the above-described steps.

After a sufficient number of the segment coils 52 are produced, the produced segment coils 52 are assembled onto the stator core 26. Specifically, each pair of the leg portions 64 of the segment coils 52 is inserted into the slot 30 from outside of the stator core 26, in the axial direction (in step S18). Next, regions of the leg portions 64 protruding outward from the slot 30 in the axial direction are bent to the circumferential direction, so that the coil end portions 38 are formed (in step S20). Then, the coil end regions 54 of each of the segment coils 52 are welded to coil end regions 54 of another one of the segment coils 52 in order to establish electrical and mechanical connection therebetween (in step S22). The above-described steps are repeated for all of the segment coils 52 to manufacture the stator coil 34.

Figure 7:
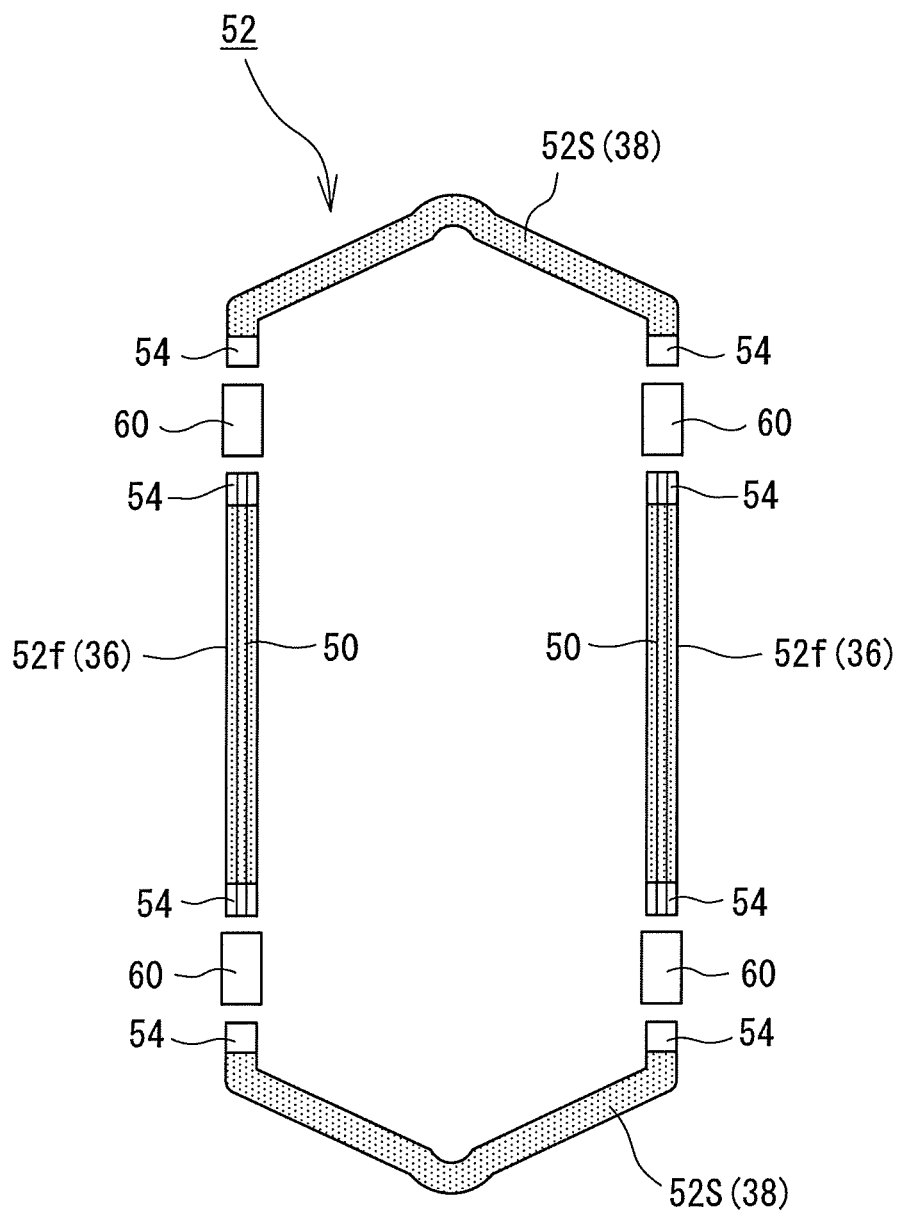
FIG. 7 shows an example of a split type segment coil.

In another embodiment, the stator coil 34 may be manufactured by means of a split type segment coil 52 as shown in FIG. 7. The segment coil 52 is split into a first segment coil 52f functioning as the straight portion 36 and a second segment coil 52s functioning as the coil end portion 38. The first and second segment coils 52f and 52s are electrically and mechanically joined to each other via joint pipes 60 which are cylindrical members composed of a conductive material (such as copper).

Figure 8:
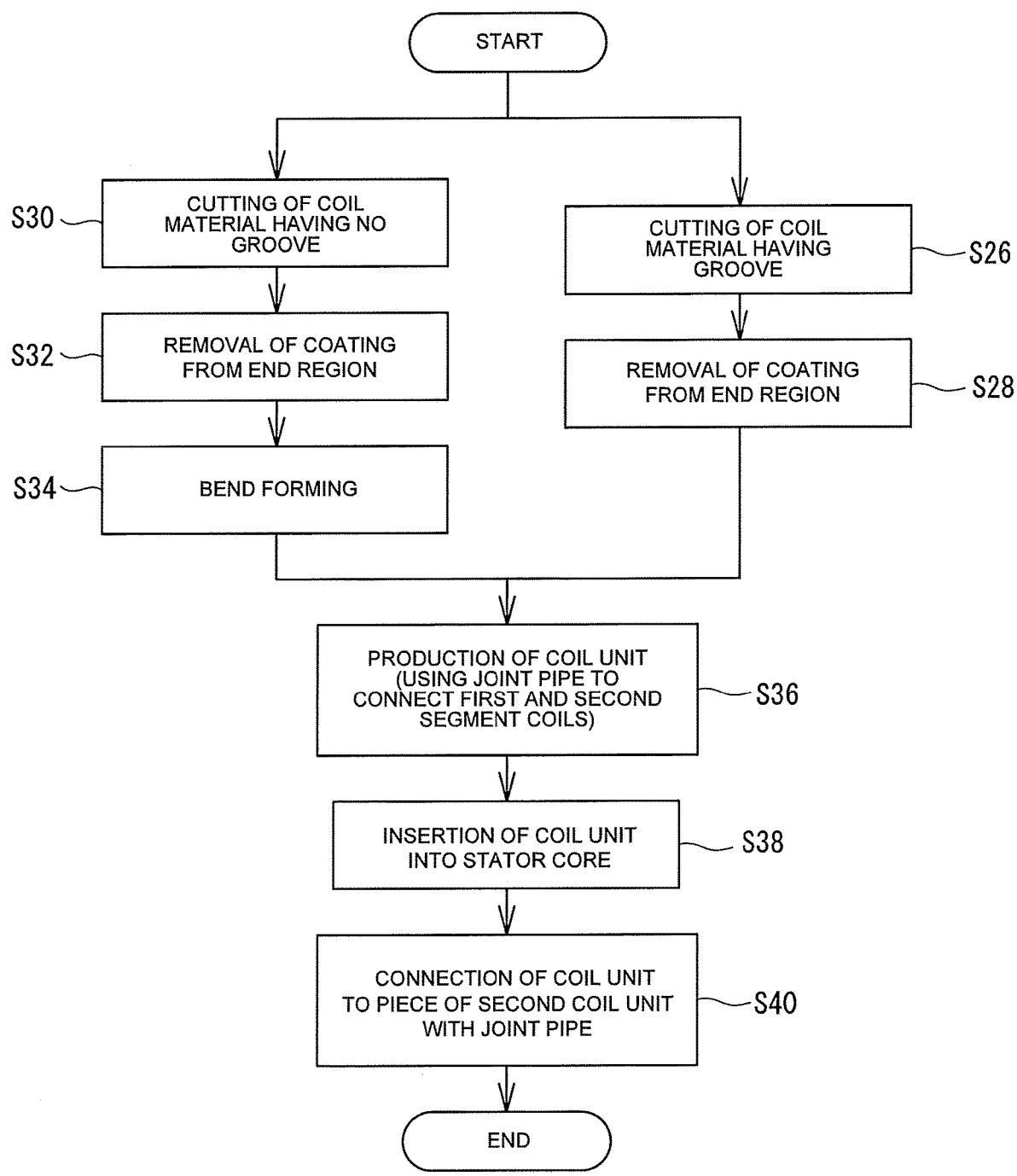
FIG. 8 is a flowchart representing a flow of process steps to manufacture the stator coil using the segment coil shown in FIG. 7.

FIG. 8 is a flowchart representing a flow of process steps to manufacture the stator coil 34 using the split type segment coil 52. To manufacture the stator coil 34, the first segment coil 52f and the second segment coil 52s are initially produced. The first segment coil 52f is produced by cutting, at a predetermined length, a coil material on which a groove has been formed (in step S26), and removing the insulation coating 58 from the coil end regions 54 being both ends of the predetermined length of the cut coil material (in step S28). Meanwhile, the second segment coil 52s is produced by cutting, at a predetermined length, a coil material having no groove (in step S30), removing the insulation coating 58 from the coil end regions 54 (in step S32), and bend-forming the predetermined length of the cut coil material into a required shape (in step S34).

After a sufficient number of the first and second segment coils 52f and 52s are produced, the produced first and second segment coils 52f and 52s are assembled onto the stator core 26. Specifically, both ends of one second segment coil 52s are respectively joined to the first segment coils 52f by means of the joint pipes 60 (in step S36). More specifically, the coil end region 54 of each of the first segment coils 52*f* is press-fitted into one end of the joint pipe 60, and the coil end region 54 of the second segment coil 52*s* is press-fitted into the other end of the joint pipe 60. This forms a component in which one second segment coil 52*s* is joined to two segment coils 52*f* so as to form the shape substantially like the letter U. Hereinafter, the component will be referred to as a "coil unit".

After formation of the coil unit, the formed coil unit is inserted into the slot 30 of the stator core 26 (in step S38). Then, both ends of the coil unit inserted into the slot 30 (i.e. the coil end regions 54 of the first segment coils 52*s*) are joined to the coil end regions 54 of a new second segment coil 52*s* by means of the joint pipes 60 (in step S40). The above-described procedural steps are repeated for all of the required number of first and second segment coils 52*f* and 52*s*, to obtain the complete stator coil 34.

As is evident from the above explanation, when the split type segment coils 52 are used, because it becomes unnecessary to perform a bend-forming process after assembly onto the stator core 26, the manufacturing process can be simplified. Further, in the split type segment coil 52, a portion of the segment coil 52 where the cooling groove 50 is formed (the straight portion 36) and the remaining other portion of the segment coil 52 (the coil end portion 38) are formed as individual components separated from each other. For this reason, the cooling groove 50 can be previously formed on the entire length of the coil material for the first segment coil 52*f*. In this case, because there is no necessity to strictly control a forming position of the cooling groove 50 (a position in a coil axial direction), the cooling groove 50 can be formed in a simplified manner.

Figure 9:
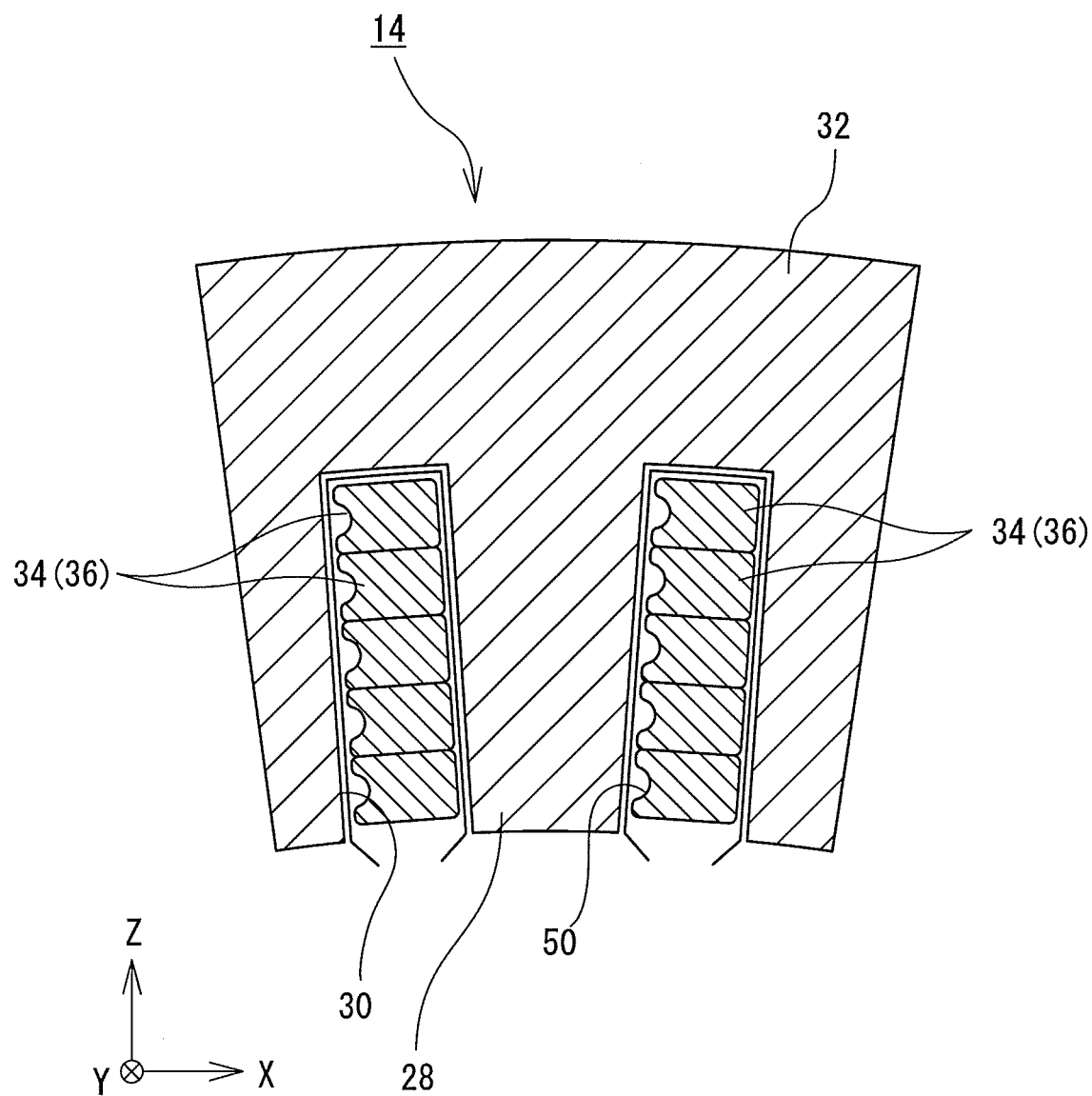
FIG. 9 is a schematic cross section view of a stator in another rotary electric machine.
Figure 10:
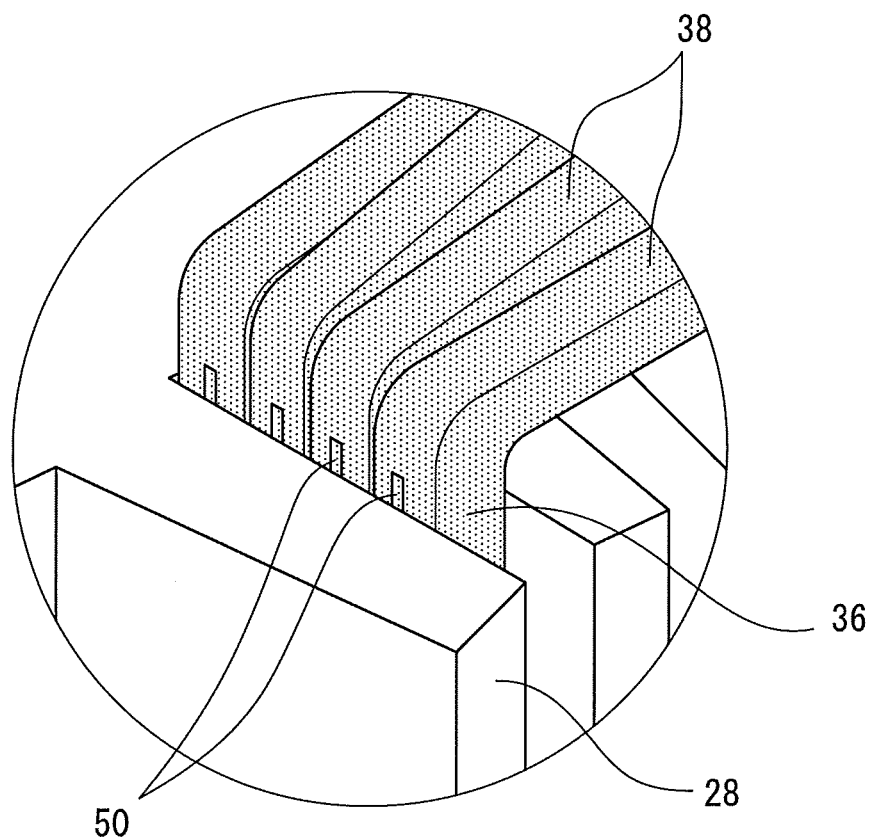
FIG. 10 is a conceptual diagram showing a state where the stator coil is assembled in one slot.

Next, another embodiment will be described with reference to FIG. 9. FIG. 9 is a schematic cross section view of the stator 14 in another example of the rotary electric machine 10. In this example, as shown in FIG. 9, the straight portions 36 are placed in a single row along the radial direction within the slot 30 as in the case of the above-described embodiment. However, the cooling groove 50 is formed, in this example, on one of circumferential end faces of the straight portion 36. When configured in this way, it can be further ensured that the cooling fluid supplied to the coil end portions 38 reaches the cooling grooves 50. This will be explained in detail with reference to FIG. 10. FIG. 10 is a conceptual diagram representing a state where the stator coil 34 is assembled in one slot 30.

As shown in FIG. 10, the stator coil 34 protruding from the slot 30 is extended slightly further along the axial direction and subsequently bent to the circumferential direction. As a result, a circumferential end face of the stator coil 34 is apt to be exposed to the outside. In this way, an end region of the cooling groove 50 formed on the circumferential end face of the straight portion 36 is apt to be exposed to the outside, thereby allowing easy flow of the cooling fluid into the cooling groove 50. In light of an assembling process of inserting the stator coil 34 into the slot 30, a circumferential width of the slot 30 is defined to be greater than a circumferential width of the straight portion 36, so that a small gap is often created between the circumferential end face of the slot 30 (or a circumferential end face of the insulator 48) and the circumferential end face of the straight portion 36. Accordingly, even in a case where the cooling groove 50 is not extended to the outside of the slot 30, the cooling fluid can easily reach the cooling groove 50 through the small gap. In other words, formation of the cooling groove 50 on the circumferential end face of the straight portion 36 can further ensure that the cooling fluid is reliably directed into the cooling groove 50.

Figure 11:
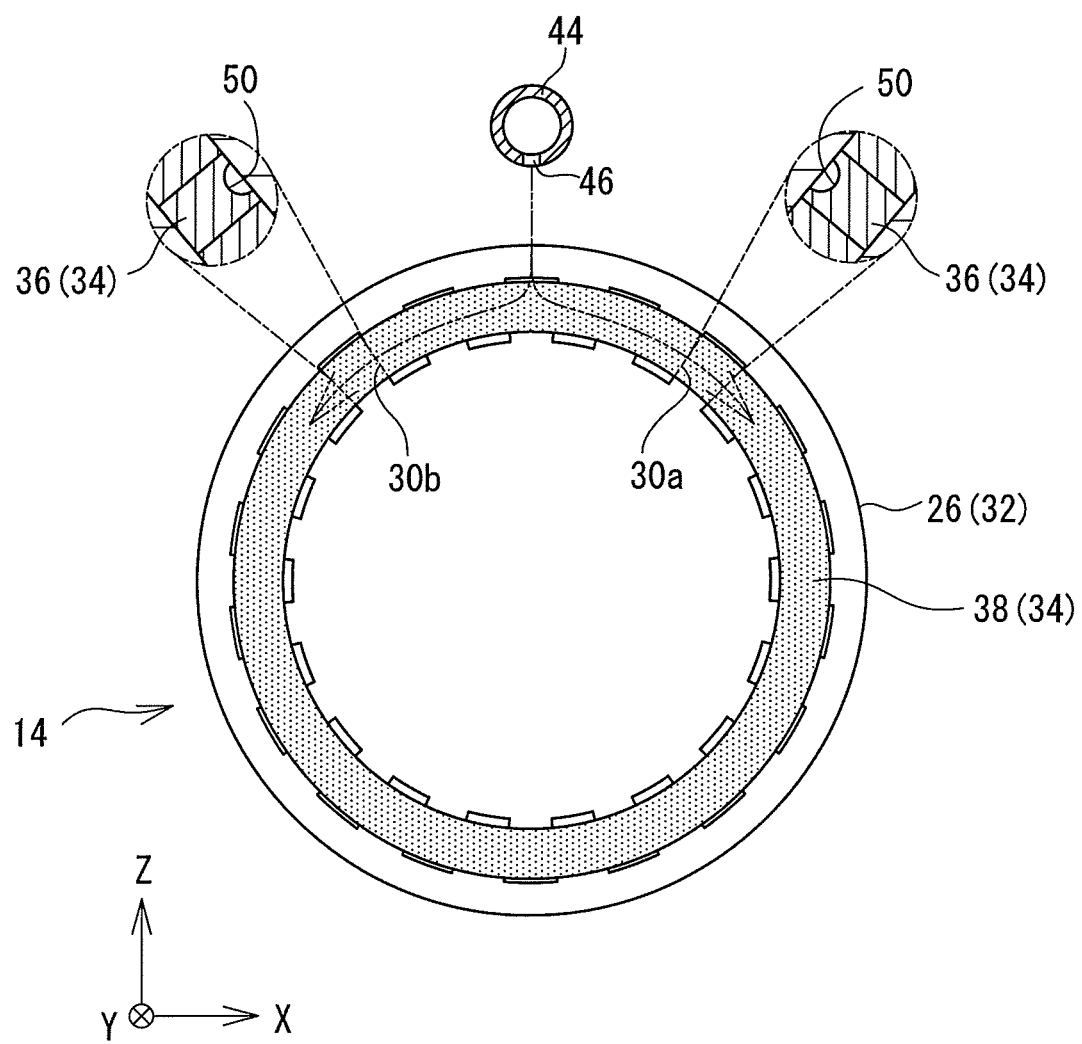
FIG. 11 is a schematic diagram of the stator as viewed along an axial direction of the stator.

In the above case, the cooling groove 50 may be formed on one of both circumferential end faces of the straight portion 36, the one being located on an upstream side in a flow direction of the cooling fluid. This will be explained with reference to FIGS. 11 and 12. FIG. 11 is a schematic diagram of the stator 14 as viewed along the axial direction. As is clear from the above explanation, an axial end face of the stator 14 has the coil end portions 38 arranged in close contact with each other to form an annular shape, while the outlet port 46 for discharging the cooling fluid is placed upward of the coil end portions 38 in the direction of gravity. Accordingly, the cooling fluid discharged from the outlet port 46 is caused to flow downward by gravity while running down on the coil end portions 38. That is, in this example, the cooling fluid flows in a direction of making a right hand turn on the right half of the drawing sheet, and flows in a direction of making a left hand turn on the left half of the drawing sheet. In this case, the cooling groove 50 may be formed for each of the straight portions 36 in a face located on the upstream side in the flow direction of the cooling fluid; i.e., in the circumferential end face located upward in the direction of gravity. Therefore, in FIG. 11, the cooling groove 50 of the straight portion 36 housed in a slot 30*a* may be formed in a left circumferential end face of the straight portion 36, while the cooling groove 50 of the straight portion 36 housed in a slot 30*b* may be formed in a right circumferential end face of the straight portion 36. In this way, it can be further ensured that the cooling fluid supplied from the outlet port 46 reliably reaches the cooling groove 50.

Figure 12:
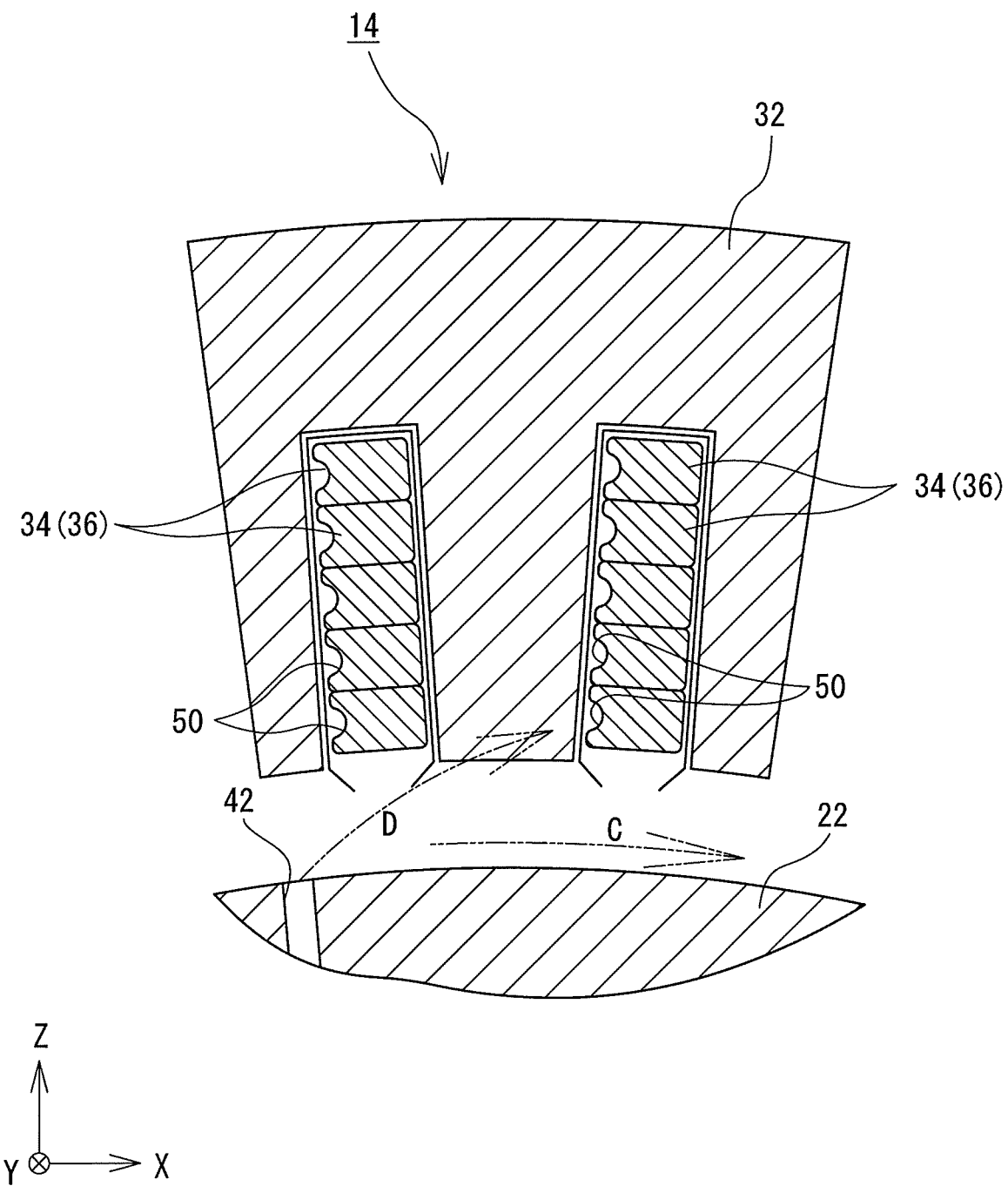
FIG. 12 is a partial cross section view of the stator and the rotor.

Meanwhile, FIG. 12 shows a partial cross section view of the stator 14 and the rotor 12. In FIG. 12, an arrow C represents a direction of forward rotation of the rotor 12. As has been described above, the rotor core 22 includes the rotor channel 42 extending along the radial direction, and the cooling fluid supplied into the rotor channel 42 is ejected toward the stator 14 by centrifugal force. During the ejection, because both a radial force caused by the centrifugal force and a circumferential force caused by inertial force are applied to the ejected cooling fluid, the ejected cooling fluid is directed to flow along an arrow D direction in FIG. 12. The cooling groove 50 may be formed in a face of the straight portion 36 located on the upstream side in the flow direction (an arrow D direction) of the cooling fluid ejected from the rotor core 22. Accordingly, in FIG. 12, the cooling groove 50 in the straight portion 36 may be formed on one of both circumferential end faces of the straight portion 36, the one being located on the upstream side in the direction of forward rotation of the rotor 12. In this way, the cooling fluid supplied from the rotor 12 can reach the cooling groove 50 with a higher degree of reliability.

The above-described forms are presented merely by way of illustration, and may be modified as appropriate, other than a feature that only one cooling groove 50 is formed for each of the straight portions 36. Accordingly, the cooling groove 50 may be formed not only in the straight portion 36 but also in the coil end portion 38. In addition, the shape, size, and a forming position of the cooling groove 50 may be changed as appropriate.

Figure 13:
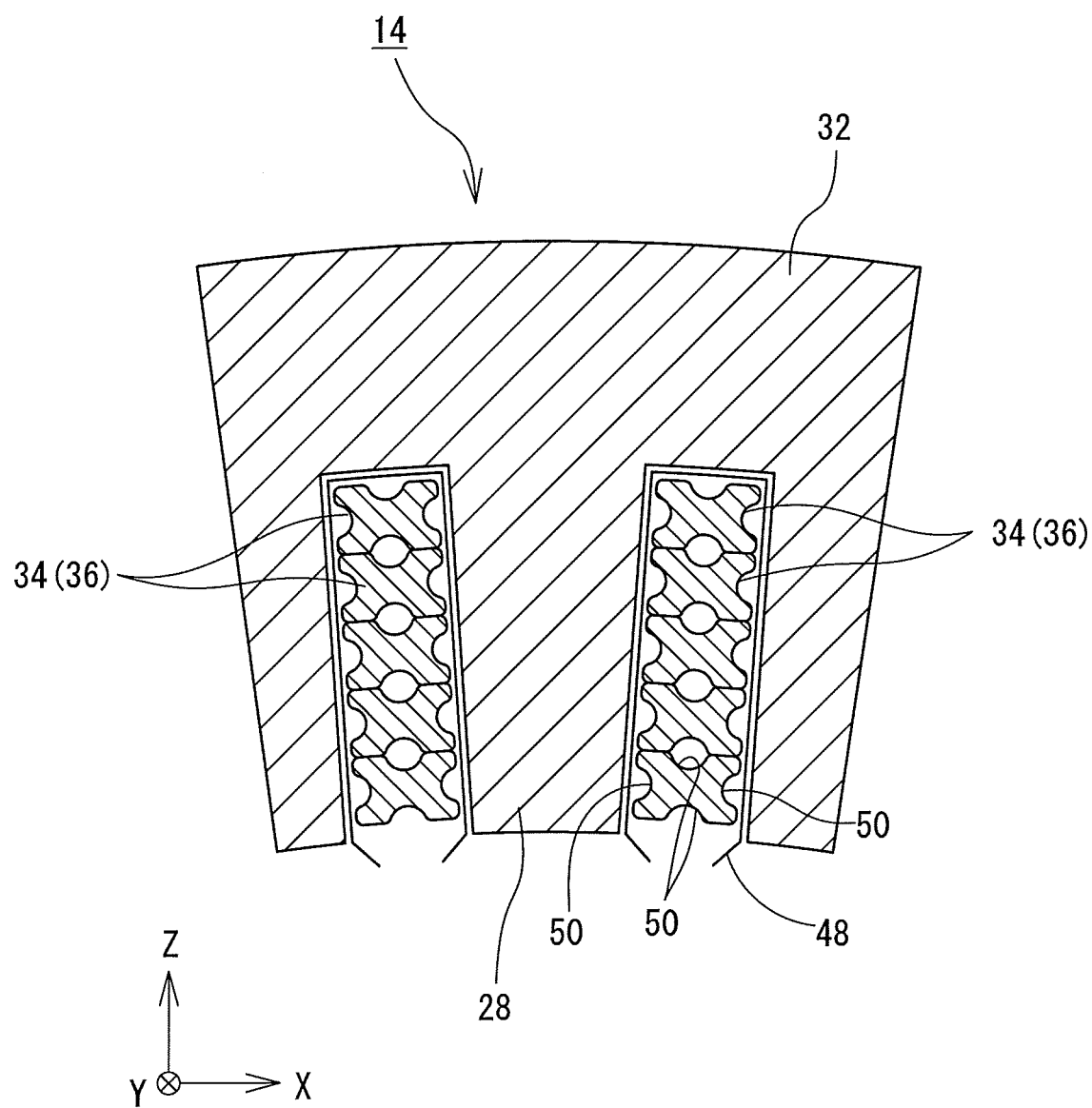
FIG. 13 is a general cross section view of a stator in a rotary electric machine according to a reference example.

Finally, a reference example of the rotary electric machine 10 will be described with reference to FIG. 13. FIG. 13 is a general cross section view of the stator 14 of the rotary electric machine 10 in the reference example. In the rotary electric machine 10 according to the reference example, the cooling grooves 50 are formed only in the straight portions 36. In this case, the stator coil 34 may be composed of the split type segment coils 52 as illustrated in FIG. 7. The number of cooling grooves 50 formed in one straight portion 36 is not limited to any specific number as long as each of the straight portions 36 includes at least one cooling groove 50, and four cooling grooves 50 as shown in FIG. 13, or two or three cooling grooves 50 may be formed for each of the straight portions 36.

REFERENCE SIGNS LIST 10 rotary electric machine, 12 rotor, 14 stator, 16 rotation shaft, 18 motor case, 20 bearing, 22 rotor core, 24 magnet, 26 stator core, 28 tooth, 30 slot, 32 yoke, 34 stator coil, 36 straight portion, 38 coil end portion, 40 in-shaft channel, 42 rotor channel, 44 cooling medium pipe, 46 outlet port, 48 insulator, 50 cooling groove, 52 segment coil, 52f first segment coil, 52s second segment coil, 54 coil end region, 56 conductive wire, 58 insulation coating, 60 joint pipe, 62 V shaped portion, 64 leg portion.

The invention claimed is:

1. A rotary electric machine comprising:
a stator core including a plurality of teeth arranged in a row along a circumferential direction of the stator core; and
a stator coil composed of a winding wire wound around one or more of the plurality of teeth, wherein:
the stator coil includes coil end portions extending, outside the stator core in an axial direction thereof, along a substantially circumferential direction of the stator core, and straight portions extending along the axial direction, the straight portions being at least partially housed in a slot which is a void defined by two adjacent teeth of the plurality of teeth,
a cooling groove is formed at least in the straight portion, the cooling groove being configured to function as a cooling channel through which a cooling fluid flows,
only one cooling groove is formed for each of the straight portions, the cooling groove being formed only in the straight portion, and is not formed in the coil end portion, and
the stator coil further includes a first segment coil functioning as the straight portion, and a second segment coil functioning as the coil end portion, the second segment coil being an independent member separated from the first segment coil and joined to the first segment coil by a joint pipe.

2. The rotary electric machine according to claim 1, wherein:
each slot houses two or more of the straight portions; and
among the two or more of the straight portions, adjacent straight portions within the slot are placed in a position where cooling grooves of the adjacent straight portions are opposed to each other.

3. The rotary electric machine according to claim 1 further comprising:
a rotor concentrically arranged inside a stator, the rotor including a cooling channel which extends to an outer circumferential end of the rotor along a radial direction thereof, wherein
one of the straight portions that is arranged at a radial innermost position within the slot has the cooling groove formed in a radial inner end face of the one of the straight portions.

4. The rotary electric machine according to claim 1, wherein the cooling groove has a substantially semicircular shape in cross section.

5. A rotary electric machine comprising:
a stator core including a plurality of teeth arranged in a row along a circumferential direction of the stator core;
a stator coil composed of a winding wire wound around one or more of the plurality of teeth, wherein
the stator coil includes coil end portions extending, outside the stator core in an axial direction thereof, along a substantially circumferential direction of the stator core, and straight portions extending along the axial direction, the straight portions being at least partially housed in a slot which is a void defined by two adjacent teeth of the plurality of teeth,
a cooling groove is formed at least in the straight portion, the cooling groove being configured to function as a cooling channel through which a cooling fluid flows, and
only one cooling groove is formed for each of the straight portion, the cooling groove being formed on one of circumferential end faces of the straight portion, and
wherein the rotary electric machine is installed in a position in which an axial direction of the rotary electric machine intersects the direction of gravity and further includes a cooling pipe configured to discharge a cooling fluid toward the coil end portion from above the coil end portion in the direction of gravity, and the cooling groove is formed in only one of the circumferential end faces of the straight portion, the one being located on an upper side of the straight portion in the direction of gravity.

6. A rotary electric machine comprising:
a stator core including a plurality of teeth arranged in a row along a circumferential direction of the stator core; and
a stator coil composed of a winding wire wound around one or more of the plurality of teeth, wherein
the stator coil comprises coil end portions extending, outside the stator core in an axial direction thereof, along a substantially circumferential direction of the stator core, and straight portions extending along the axial direction, the straight portions being at least partially housed in a slot which is a void defined by two adjacent teeth of the plurality of teeth,
a cooling groove is formed at least in the straight portion, the cooling groove being configured to function as a cooling channel through which a cooling fluid flows, and
only one cooling groove is formed for each of the straight portions, the cooling groove being formed in only one of circumferential end faces of the straight portion that is located upstream in a direction of forward rotation of the rotor.

* * * * *